Oct. 27, 1925.  1,558,863
F. H. GLEASON
MEANS FOR LUBRICATING DRAG LINK CONNECTIONS OF THE STEERING
GEAR OF VEHICLES
Filed Sept. 22, 1921   2 Sheets-Sheet 1

Inventor
F. H. Gleason
by T. F. Bourne
atty.

Oct. 27, 1925.
F. H. GLEASON
MEANS FOR LUBRICATING DRAG LINK CONNECTIONS OF THE STEERING GEAR OF VEHICLES
Filed Sept. 22, 1921
1,558,863
2 Sheets-Sheet 2
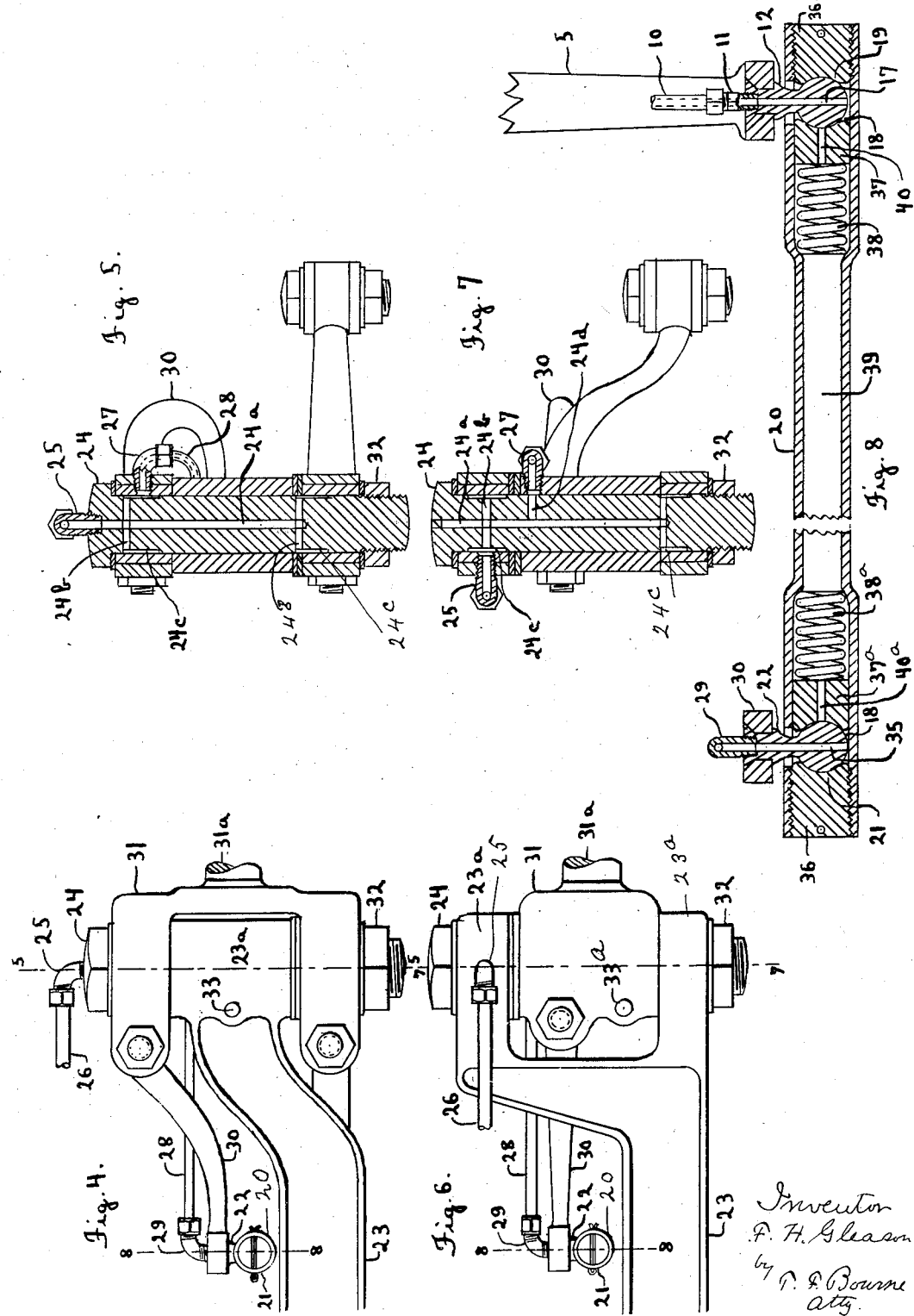
Inventor
F. H. Gleason
by T. F. Bourne
Atty.

Patented Oct. 27, 1925.

1,558,863

UNITED STATES PATENT OFFICE.

FREDERICK H. GLEASON, OF NEW YORK, N. Y.

MEANS FOR LUBRICATING DRAG-LINK CONNECTIONS OF THE STEERING GEAR OF VEHICLES.

Application filed September 22, 1921. Serial No. 502,390.

*To all whom it may concern:*

Be it known that I, FREDERICK H. GLEASON, a citizen of the United States, and resident of New York city, borough of Manhattan, in the county of New York and State of New York, have invented certain new and useful Improvements in Means for Lubricating Drag-Link Connections of the Steering Gear of Vehicles, of which the following is a specification.

The object of my invention is to lubricate the joints of the drag link, the steering gear case and the bearings of the knuckle of a vehicle with lubricant connections not requiring flexing.

In accordance with my invention, I provide the steering gear shaft with a bore to receive lubricant, a supply fitting to supply lubricant to the bore of said shaft, said bore communicating with the steering gear case to supply it with lubricant and with a conduit to supply lubricant to the rear drag-link joint that is connected to the steering gear shaft, as by means of a bell crank. I provide the bolt of the knuckle for the front wheel with a bore to receive lubricant and a conduit to be supplied with lubricant from said bore of the bolt and in communication with the front drag link joint that is connected with an arm of the knuckle.

My invention also comprises novel details of improvement that will be more fully hereinafter set forth and then pointed out in the claims.

Reference is to be had to the accompanying drawings forming part hereof, wherein:

Fig. 4 is a front view illustrating my improvements in connection with the steering knuckle of the vehicle;

Fig. 5 is a section on line 5, 5, in Fig. 4;

Fig. 6 is a view similar to Fig. 4 of a different form of steering knuckle embodying my invention;

Fig. 7 is a section on line 7, 7, in Fig. 6; and

Fig. 8 is a longitudinal section through the drag link and its bearing on line 8, 8, in Fig. 4.

Figure 1:
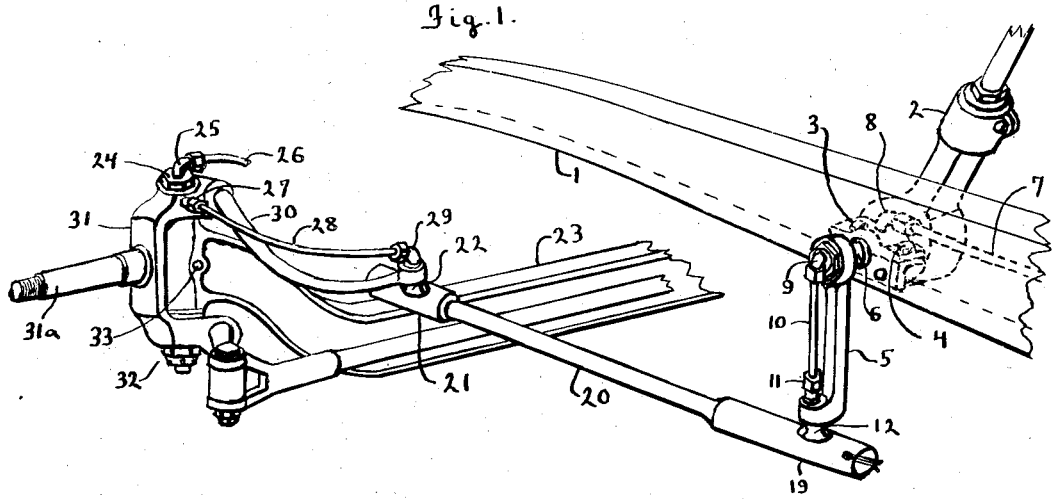
Figure 1 is a perspective view of the drag link connection of an automobile or motor vehicle embodying my invention.
Figure 2:
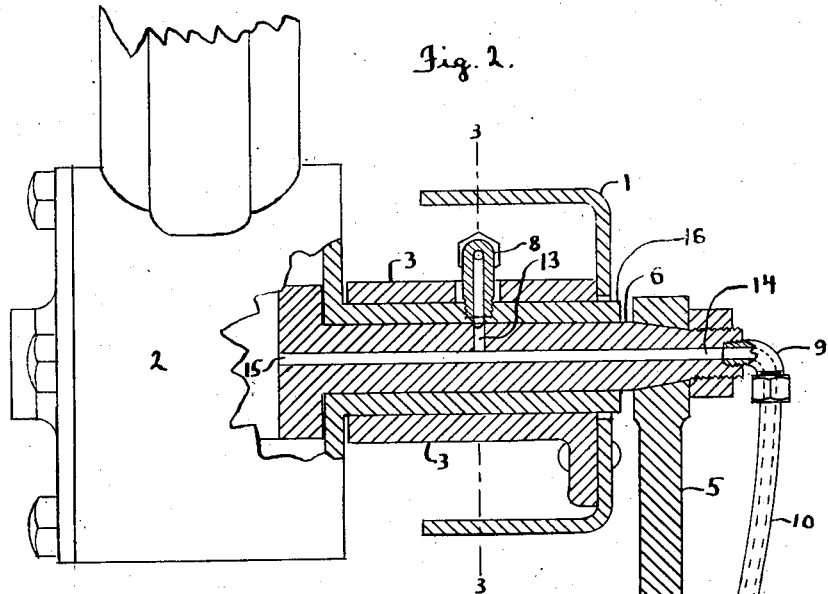
Fig. 2 is a vertical partially sectional view, enlarged, in a transverse plane of the steering gear case, shaft, bell crank and rear drag link joint.
Figure 3:
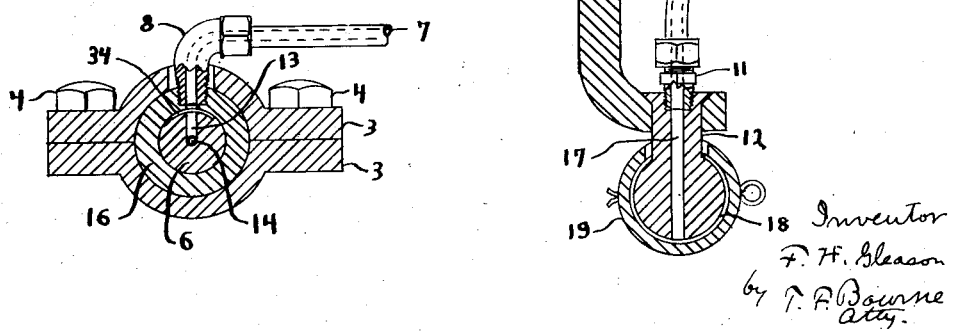
Fig. 3 is a sectional view on line 3, 3, in Fig. 2.

Similar numerals of reference indicate corresponding parts in the several views. In Figs. 1 and 2 the steering gear case 2 is shown attached to the vehicle chassis frame 1 by clamping the boss 16 of case 2 between the split bracket 3, 3, attached to chassis frame by rivets, said bracket being clamped around boss 16 by means of screws 4, 4. A lubricant supply fitting 8, supplied by tube 7, is attached to the top surface of boss 16. The bore of fitting 8 is in communication with the bore or passage 14 of steering gear shaft 6 through oil groove 34 in the upper surface of shaft 6 (in Fig 3), and through bore 13 of shaft 6, the oil groove 34 in shaft 6 providing communicating passage from the bore of fitting 8 to bores 13, 14, of shaft 6 in all angular positions of said shaft. Lubricant from bore 14 passes to steering gear case 2 from outlet 15 of said bore (Fig. 2). An elbow fitting 9 is shown attached to the outer end of shaft 6 with its bore in communication with bore 14 of shaft 6. A tube 10 connects fitting 9 with fitting 11 attached to the bearing or ball 12 of the rear joint 19 of drag link 20. A bore 17 through ball 12 provides passage for the lubricant from the bore of fitting 11 to the moving surfaces at 18 of rear drag link joint 19. The ball 12 is attached to bell crank arm 5 that is attached to shaft 6. Since parts 6, 5, 9, 10, 11, 12, all move together as a unit, lubricant supplied through fitting 8 will lubricate the shaft 6 in its bearing in boss 16 of case 2; will supply lubricant through bores 13, 14, and outlet 15 to the gears in case 2, and will supply lubricant through bores 13, 14, fitting 9, tube 10, fitting 11 and bore 17 through ball 12 to the rear drag link joint 19, within link 20. A threaded plug 36 at one end of drag link 20 on the outer side of bearing or ball 12 and a slidable plug 37 on the other side of said bearing within the drag link, pressed by spring 38 against bearing 12, provide the joint for said bearing or ball. A passage 40 in plug 37 permits lubricant supplied within the drag link through bore 17 to flow beyond plug 37 into the hollow link. At the opposite or front end of drag link 20 is a bearing or ball 22 shown in bearing 21 comprising threaded plug 36 and slidable plug 37ª pressed by springs 38ª against bearing or ball 22 and provided with passage 40ª for lubricant. When the front bearing 21 of drag link 20 is lower than the rear bearing 19, as for instance, when the chassis is going down hill lubricant in space 39 supplied through passage 40 will flow through passage 40ª to the front bearing or ball 22. Bearing or ball 22 is provided with a bore 35 communicating with the bore of fitting 29 attached to said bearing. The spaces 18 at opposite ends of the drag link respectively receive lubricant from bores 17 and 35. The bearing or ball 22 is connected with arms 30 of steering knuckle 31 whose spindle 31ª is adapted to receive bearings for a road wheel in a well known manner, whereby the drag link may operate said knuckle.

The fitting 29 is connected by conduit 28 with fitting 27 to supply lubricant to the drag link bearing. In the form shown in Figs. 1, 4, and 5, the steering knuckle 31 is journaled upon bolt 24 that is secured by pin 33 to eye 23ª of axle 23. A lubricant supply fitting 25 is attached to bolt 24 and communicates with a passage 24ª therein, which passage, by means of lateral bores 24ᵇ leading to exterior grooves 24ᶜ in the bolt, supplies lubricant to the bearing of the knuckle journaled on the bolt. The fitting 27 carried by the knuckle communicates through the latter with one of the passages 24ᶜ and conduit 28 connects fitting 27 with fitting 29 on the drag link bearing or ball 22.

The conduit 26 connects with fitting 25 to supply lubricant thereto from any suitable source on the vehicle. The lubricant flowing to fitting 25 not only lubricates the knuckle bearings but flows through conduit 28 and fitting 29 to lubricate the drag link bearing 21. By means of the passage 40ª lubricant supplied through conduit 28 may pass into the bore 39 of drag link 20 and may flow through passage 40 to ball 12 when the drag link is tilted downwards toward said ball.

In the form shown in Figs. 6 and 7, where the bolt 24 rotates with the knuckle 31 and is secured thereto by pin 33ª the bolt 24 rotating in the forked bearings 23ª of axle 23, the fitting 25 is attached to one of the jaws 23ª and communicates with one of the passages 24ᶜ of bolt 24, the fitting 27 being attached to the knuckle and communicating through a passage 24ᵈ in bolt 24 with its bore 24ª. The conduit 28 connects fittings 27 and 29 as before explained. Lubricant from conduit 26 flows through fitting 25, passages 24ᶜ, 24ᵇ, 24ª, and 24ᵈ, to fitting 27, thence through conduit 28 to fitting 29 to supply bearing or ball 22 with the lubricant, which may flow through the passage 40ª in the manner before described.

The lubricant may be supplied to conduits 7 and 26 from any suitable source, such as by means of a pump carried by the vehicle, preferably to be charged to the various conduits as desired under pressure. Since the conduit 10 moves uniformly with the crank 5 and since the conduit 28 moves uniformly with the knuckle and with its arm 30, there will be no working strains on said conduits to interfere with the proper flow of the lubricant thereto. So far as lubricating the rear and front bearings 19 and 21 of drag link 20 is concerned it will be apparent that by reason of the passages 40 and 40ª and the bore 39 within said link both of the said bearings will receive lubricant through either of the conduits 10 or 28 regardless of the other. For instance, in the case of lubricant leakage, or stoppage of either of the conduits 10 or 28, the other may supply lubricant for all of the bearings of the drag link, and, if desired, either the conduit 10 or the conduit 28 may be used solely for lubricating the drag link bearings.

Changes may be made in the details of construction set forth within the scope of the appended claims without departing from the spirit of the invention.

Having now described my invention, what I claim is:

1. The combination of a steering gear shaft having an arm, a drag link, a bearing for said link connected with said arm, and means to supply lubricant to said shaft and from the shaft to said bearing.

2. The combination of a steering gear shaft provided with a passage for lubricant, means to conduct lubricant to said passage, said shaft having a crank arm, a drag link, a bearing therefor connected with said arm, and a conduit connecting said passage of said shaft with the drag link bearing.

3. The combination of a steering gear shaft provided with a passage for lubricant, means to conduct lubricant to said passage, said shaft having a crank arm, a drag link, a bearing therefor connected with said arm, and a conduit connecting said passage of said shaft with the drag link bearing, the drag link being tubular and provided with means therein to receive lubricant from said bearing.

4. The combination of a steering gear shaft provided with a passage for lubricant, means to conduct lubricant to said passage, said shaft having a crank arm, a drag link, a bearing therefor connected with said arm, said bearing having a passage, and a conduit connecting the passage of said shaft with the passage in said bearing.

5. The combination of a steering gear having a casing and a shaft provided with a passage communicating with said casing, means to supply lubricant to said passage, a crank arm on said shaft, a drag link having a bearing connected with said crank arm, and a conduit connecting said passage of said shaft with said bearing.

6. The combination of a steering gear having a casing and a shaft provided with a passage communicating with said casing, means to supply lubricant to said passage, a crank arm on said shaft, a drag link having a bearing connected with said crank arm, and a conduit connecting said passage of said shaft with said bearing, said bearing having a passage communicating with said conduit.

7. The combination of a steering gear having a casing and a shaft provided with a passage communicating with said casing, means to supply lubricant to said passage, a crank arm on said shaft, a drag link having a bearing connected with said crank arm, a fitting connected to said shaft and communicating with its passage, a fitting connected to said drag link bearing and communicating with its passage, and a conduit connecting said fittings.

8. The combination of an axle, a steering knuckle, a bolt pivotally connecting the same, the bolt having a passage, fittings communicating with said passage, a drag link, an arm connecting the link with the knuckle, a fitting communicating with said bearing, and a conduit connecting said fitting with one of the first named fittings, said arm comprising a ball member having a passage communicating with said conduit.

9. In a lubricating structure the combination with a steering gear shaft, of a drag link having a bearing, means for supplying lubricant to the steering gear shaft, and means for conveying lubricant from the steering gear shaft to the drag link bearing.

10. In a lubricating structure, the combination with a steering gear shaft having an axial passageway and a radial passageway leading from the periphery of the shaft to the axial passageway, of a drag link having a bearing, means for supplying lubricant to the radial passageway in the shaft, and means for conveying lubricant from the axial passageway in the shaft to the drag link bearing.

11. In a lubricating structure, a steering gear shaft having an axial passageway and a radial passageway leading to the axial passageway, an arm carried by said shaft, a drag link having a bearing carried by said arm, a pipe having one end threaded into the axial passageway in said shaft and its other end threaded into the said bearing, and means for supplying lubricant to the radial passageway in said shaft.

12. In a lubricating structure, a steering gear shaft having an axial passageway and a radial passageway leading from the periphery of the shaft to the axial passageway, an arm carried by said shaft, a drag link having a bearing carried by said arm, said bearing including a ball member movable within the drag link, and formed with a passageway therethrough, a pipe having one end threaded into the axial passageway in said shaft, and its other end threaded into the passageway through said bearing, and means for supplying lubricant to the radial passageway in said shaft.

Signed at New York city, in the county of New York, and State of New York, this 19th day of September, A. D. 1921.

FREDERICK H. GLEASON.